United States Patent [19]

Maresh

[11] Patent Number: 5,299,613
[45] Date of Patent: Apr. 5, 1994

[54] TIRE CHAIN CROSS MEMBER ASSEMBLIES AND TIRE CHAINS USING THE SAME

[75] Inventor: Joseph D. Maresh, Dundee, Oreg.

[73] Assignee: Burns Bros., Inc., Portland, Oreg.

[21] Appl. No.: 12,471

[22] Filed: Feb. 2, 1993

[51] Int. Cl.$^5$ .............................................. B60C 27/06
[52] U.S. Cl. ................................... 152/221; 24/114.5; 59/93
[58] Field of Search ........ 152/221; 24/129 W, 115 A, 24/114.5, 128, 702; 59/93

[56] References Cited

U.S. PATENT DOCUMENTS

| | | | |
|---|---|---|---|
| 2,359,084 | 9/1944 | Carlson | 72/416 |
| 2,714,914 | 8/1955 | Champigny | 152/222 |
| 2,758,491 | 8/1956 | Buchanan | 72/416 |
| 2,767,760 | 10/1956 | Granger | 152/242 X |
| 3,082,500 | 3/1963 | Moreau | 24/129 W X |
| 3,146,519 | 9/1964 | Redwine | 29/862 |
| 3,752,204 | 8/1973 | Ouellette | 152/219 |
| 4,280,545 | 7/1981 | Martinelli | 152/222 |
| 4,366,850 | 1/1983 | Coutts | 152/222 |
| 4,560,424 | 12/1985 | Augoyard | 148/526 |
| 5,056,574 | 10/1991 | Maresh et al. | 152/241 |
| 5,068,948 | 12/1991 | Blankenship et al. | 24/115 A |

*Primary Examiner*—Michael W. Ball
*Assistant Examiner*—Francis J. Lorin
*Attorney, Agent, or Firm*—Shapiro and Shapiro

[57] ABSTRACT

A cross member assembly of a tire chain comprises a flexible cable having double bushings at each of its ends. Each double bushing includes an outer bushing and an inner bushing spaced longitudinally of the cable and connected by a bridge. The outer bushing securely grips the cable, and the inner bushing embraces the cable without gripping it. Each double bushing is attached to a plate for connecting the cable to a side member of the tire chain. The plate has an opening through which the outer bushing is inserted and has a bent over tab for trapping the outer bushing between the tab and the body of plate, with the inner bushing located exteriorly of the opening and with the bridge located in the opening. Tire chains using the cross member assemblies have substantially increased endurance.

13 Claims, 4 Drawing Sheets

TIRE CHAIN CROSS MEMBER ASSEMBLIES AND TIRE CHAINS USING THE SAME

BACKGROUND OF THE INVENTION

This invention is concerned with improved cable-type cross member assemblies for tire chains, and with improved tire chains utilizing such assemblies.

U.S. Pat. No. 5,056,574 issued Oct. 15, 1991, assigned to the assignee of the present invention, and incorporated herein by reference, discloses and claims tire chains that have flexible cross member cables forming a zig-zag pattern, and that have significant advantages when compared with tire chains of the prior art. Among those advantages are greater endurance. The present invention provides a remarkable further improvement in tire chain endurance.

In the tire chains of the aforesaid patent and the tire chains disclosed and claimed in U.S. Pat. No. 4,366,850, assigned to the assignee of the present invention, and incorporated herein by reference, a single bushing is crimped to each end of each cross member cable and is passed through a keyhole-shaped opening in a side member connector plate. Then a tab portion of the plate is bent over toward the body of the plate to trap the bushing between the tab and the plate body. An advantage of this arrangement is that the cross member may be readily replaced by unbending tabs to remove the cross member, inserting a new cross member, and then re-bending the tabs. However, disadvantages of this arrangement are the potential for fatigue breakage of a cable end where it passes through the keyhole slot, and the potential for abrasion wear between the bushing and surrounding surfaces of the tab and plate body.

BRIEF DESCRIPTION OF THE INVENTION

The present invention provides an improved tire chain cross member assembly that substantially reduces fatigue breakage of cross member cables and that substantially increases the endurance of tire chains using such cross member assemblies.

The present invention also provides an improved tire chain cross member assembly that substantially reduces abrasion wear between bushings and associated connector surfaces at the ends of cross member cables.

The invention further provides improved tire chains using the improved cross member assemblies.

In one of its broader aspects, the invention is a cross member assembly for a tire chain, comprising a flexible cable having a double bushing at least at one end of the cable, the double bushing including an outer bushing and an inner bushing spaced longitudinally of the cable and joined by a bridge, the outer bushing securely gripping the cable end therein, and the inner bushing embracing the cable without gripping the cable, and a connector adjacent to the end of the cable for connecting the cable to a side member of the tire chain, the connector including a plate having an opening therein through which the outer bushing is inserted, the plate having a bent-over tab extending from a body of the plate and trapping the inserted outer bushing between the tab and the plate body, with the inner bushing located exteriorly of the opening and with the bridge located in the opening.

In another of its broader aspects, the invention is a tire chain cross member assembly comprising a flexible cable and a double bushing, the double bushing including an outer bushing and an inner bushing spaced longitudinally of the cable and joined by a bridge, the outer bushing securely gripping an end of the cable, and the inner bushing embracing the cable without gripping the cable.

In yet another of its broader aspects, the invention is a cross member assembly for a tire chain, comprising a flexible cable having a bushing securely gripping an end of the cable, and a plate having an opening through which the bushing is inserted, the plate having a bent-over tab extending from a body of the plate and trapping the bushing between the tab and the plate body, a portion of the plate cooperable with the bushing having a shape that conforms with the shape of the bushing, so as to reduce the mobility of the bushing relative to the plate.

BRIEF DESCRIPTION OF THE DRAWINGS

The invention will be further described in conjunction with the accompanying drawings, which illustrate a preferred (best mode) and exemplary embodiment, and wherein.

DETAILED DESCRIPTION OF THE INVENTION

Figure 1:
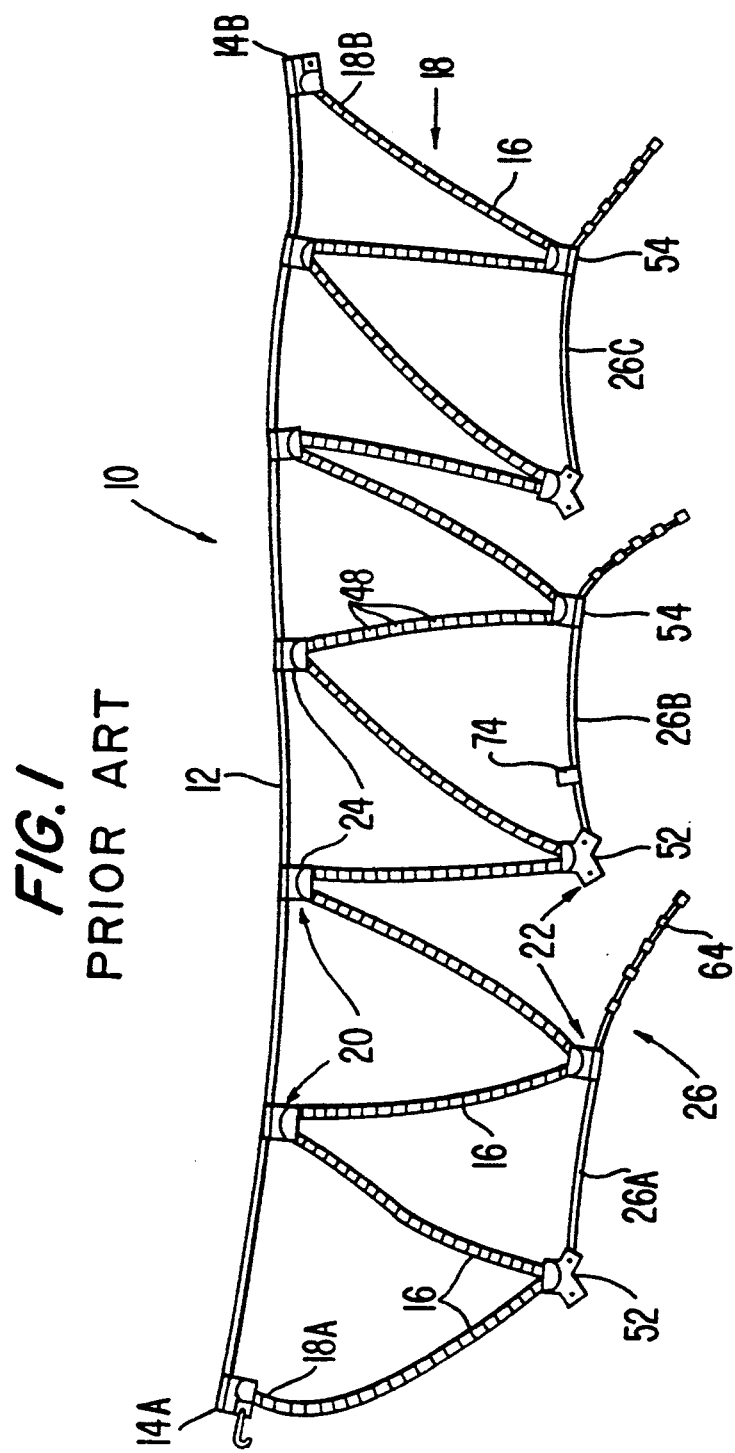
FIG. 1 is a plan view of a tire chain of the aforesaid U.S. Pat. No. 5,056,574, in which the present invention may be incorporated.

The invention will be described in its application to an improvement of a type of tire chain disclosed and claimed in the aforesaid U.S. Pat. No. 5,056,574, but it will be understood that the invention has applicability to other tire chains using cross member cables. For convenience, reference numerals used herein are the same as or similar to those used in U.S. Pat. No. 5,056,574, where appropriate.

As shown in FIG. 1, a tire chain 10 comprises an elongated inner side member 12 having cooperable fastener elements 14A, 14B at opposite ends thereof, and a plurality of cross members 16 forming a zig-zag diagonal pattern 18 with opposite ends 18A, 18B of the pattern located adjacent to respective fastener elements of the inner side member. The cross members 16 (later described in greater detail) comprise cables supporting traction elements in the form of rollers 48. The rollers are preferably coil springs.

The pattern 18 includes a plurality of inner vertices 20 adjacent to and spaced along the inner side member 12 and a plurality of outer vertices 22 remote from the inner side member. The inner vertices have connectors 24 for attaching them to the inner side member at predetermined, substantially equally-spaced, positions. The outer vertices 22 are attached to additional connectors, which, in the embodiment illustrated, are of two types, a first type 52, and a second type 54. Each connector includes a plate having a bent-over tab extending from the body of the plate, as later described in greater detail.

The tire chain also comprises a tensioning device 26 for drawing the outer vertices 22 toward the rotational axis of a wheel and for providing adjustable spacing between adjacent outer vertices. The tensioning device comprises three cable segments 26A, 26B, 26C associated with the outer vertices. One end of each cable segment is anchored to a connector 52, and, in the form shown, the cable segment then passes slidably through a succeeding connector 54. A free end 64 of each cable segment has a series of spaced lugs crimped or otherwise attached thereto. The lugs are adapted to be passed through and retained in a keyhole-shaped opening in an adjacent connector 52, after which the free end 64 is held by a spring clip 74. By virtue of this arrangement, the effective length of each cable segment may be selected. U.S. Pat. No. 3,752,204, assigned to the same assignee as the present invention, and incorporated herein by reference, discloses a similar arrangement for selecting the effective length of a side member cable.

When a tire chain of the type shown in FIG. 1 is fully mounted on a wheel, the cable segments are joined seriatim to form a substantially continuous outer side member 26A-26B-26C. The inner side member 12 forms a circle of predetermined circumference about the rim of the vehicle wheel at the inner side thereof. The cross members 16 extend back and forth across the tread of a tire mounted on the wheel rim, and the outer side member, coupled to the connectors 52 and 54 of the outer vertices 22, draws the outer vertices toward the rotational axis of the wheel and applies tension to the cross members.

In the tire chain shown in FIG. 1, alternate outer vertices 22 are fixed in position upon the outer side member, by means of the connectors 52, and the intermediate outer vertices are slidable along the outer side member by virtue of the connectors 54. With this arrangement, each outer vertex is adjustable circumferentially relative to adjacent outer vertices, but because of the fact that alternate outer vertices are fixed in position on the outer side member, bunching of the vertices (and even stripping of the tire chain from the wheel) cannot occur, even under severe acceleration or braking. In use, the zig-zag pattern 18 remains substantially uniform. Other features and advantages of the tire chain are discussed in detail in the aforesaid U.S. Pat. No. 5,056,574.

Figure 2:
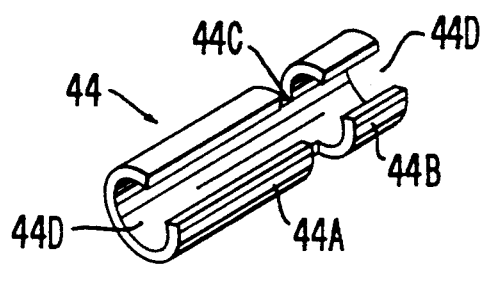
FIG. 2 is a perspective view of a double bushing of the invention.

In accordance with the present invention, instead of a single bushing fixed to each end of each cross member cable, as described earlier and as shown, for example, in FIG. 3 of U.S. Pat. No. 5,056,574, a double bushing is employed. A typical double bushing 44, before attachment to a cable end, is shown in FIG. 2 and comprises an outer bushing 44A and an inner bushing 44B spaced longitudinally and connected by a bridge 44C. (The terms "outer" and "inner" bushings are used with reference to corresponding longitudinal portions of each cross member cable, not with reference to the side members of the tire chain.) Each bushing is a cylinder split longitudinally to provide a slit 44D at the side thereof opposite to the side at which the bridge 44C connects the cylinders, but the slits need not be diametrically opposite to the bridge. The bridge may be somewhat flattened. More than one bridge may be used to connect the cylinders. For example, each double bushing may have two bridges located diametrically opposite each other.

The double bushings may be formed from steel strip by a stamping operation. A plurality of double bushings may be formed so as to be joined together seriatim as a "stick," and then broken off from the stick to provide individual double bushings. The double bushings may also be formed from tubing by a machining operation, in which case the bushings need not be split longitudinally, and the bridge may be tubular.

Figure 3:
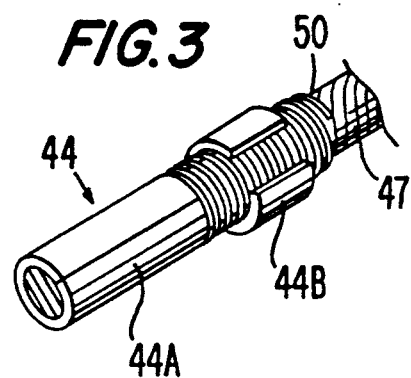
FIG. 3 is a perspective view showing the double bushing applied to a cross member cable end.
Figure 4A:
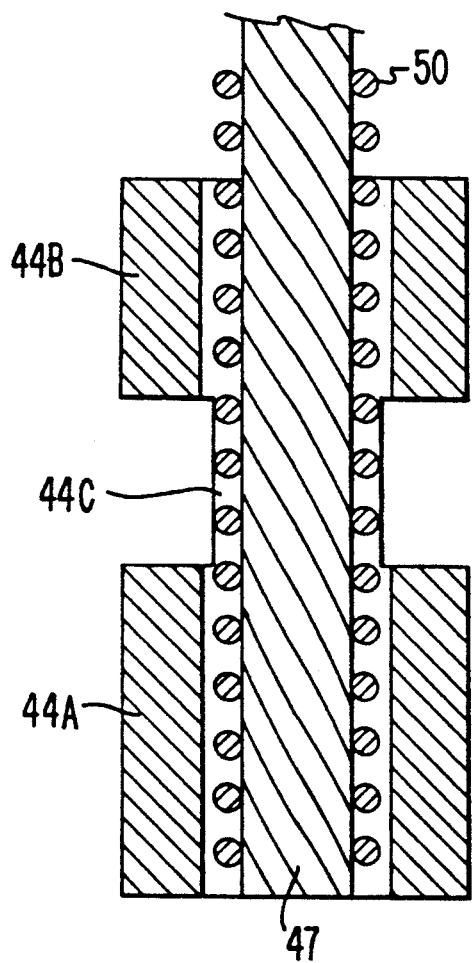
FIGS. 4A and 4B are longitudinal sectional views illustrating, somewhat diagrammatically, the manner in which the double bushing is applied to a cable end.
Figure 4B:
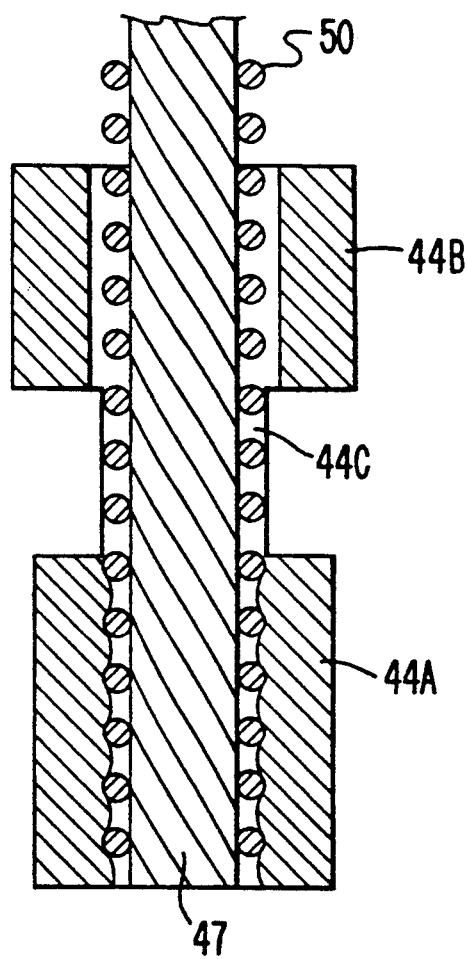

FIG. 3 illustrates a double bushing attached to an end of a flexible cross member cable 47. The cable is preferably a stranded steel cable of the type commonly used in tire chain cross members and is preferably wrapped with a helical steel wire 50 (plow wire). The double bushing is slipped over the cable end, and the outer bushing 44A is crimped or otherwise deformed so that it securely grips the cable end, compressing the cable strands within the outer bushing. In this attachment process, the split cylinder of the outer bushing closes around the cable end. There is no such closing of the cylinder of the inner bushing 44B, however. The inner cylinder is not deformed, and thus it embraces, but does not grip the cable. FIG. 4A illustrates the double bushing before the outer bushing is deformed, while 4B illustrates the double bushing after the outer bushing is deformed. It will be noted that the inner diameter of the inner bushing is slightly greater than the outer diameter of the wrapped cable.

Figure 5:
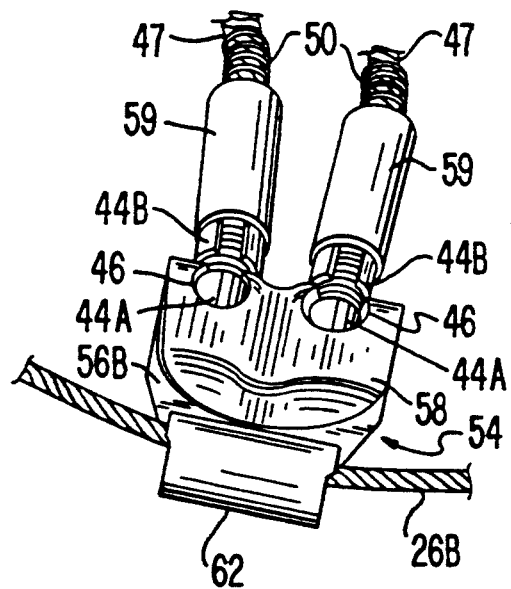
FIG. 5 is a perspective view showing ends of a pair of adjacent cross member cables attached to a connector employed for connecting cross members to a side member of a tire chain.
Figure 6:
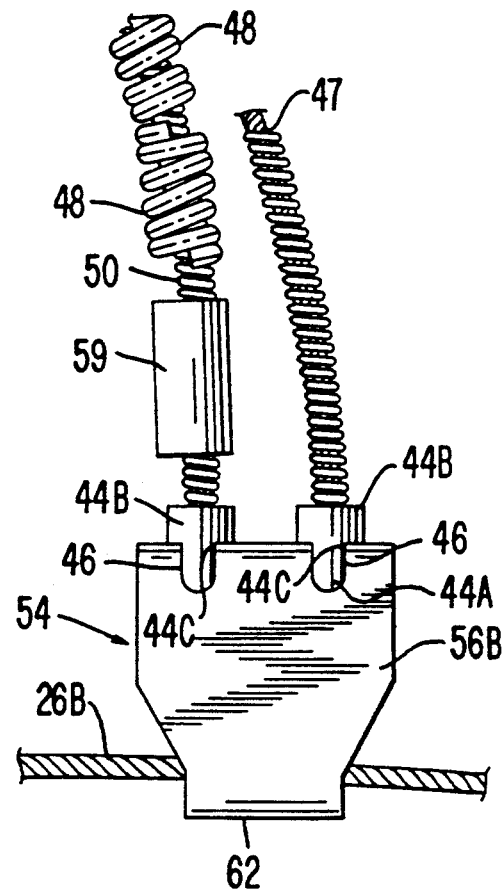
FIG. 6 is a plan view showing the back of the structure shown in FIG. 5.

As shown in FIGS. 5 and 6, each cable end is attached to a steel connector for connecting the cable end to a side member of a tire chain. The connector shown in FIG. 5 is one of the sliding connectors 54 of the tire chain of FIG. 1 and comprises a plate 56B having a sleeve 62 through which a side cable 26B is slidable, and having a bent-over tab 58 extending from the body of the plate. The connector is provided with a pair of keyhole-shaped openings 46. Each opening has a wide portion, preferably a circular portion formed in the tab, merging with a narrow portion that preferably extends from the tab to the body of the plate.

Before the tab is bent over toward the body of plate, as shown in FIG. 5, outer bushings 44A secured to a pair of adjacent cable ends forming a vertex are inserted through the wide portion of corresponding openings 46, and the position of each double bushing is adjusted so that its bridge 44C is located in the narrow portion of the respective opening, with the inner bushing 44B located exteriorly of the opening, as shown in FIGS. 5 and 6. Then the tab 58 is bent over toward the body of the plate 56B so as to trap the outer bushings between the tab and the plate body, as shown in FIG. 5. FIGS. 5 and 6 also show plastic sleeves 59 that form spacers between the inner bushings 44B and adjacent traction rollers 48, but this is not essential to the invention.

Figure 7:
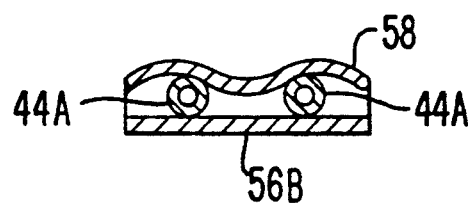
FIG. 7 is a transverse sectional view illustrating interiorly, a portion of the structure shown in FIG. 5.
Figure 8:
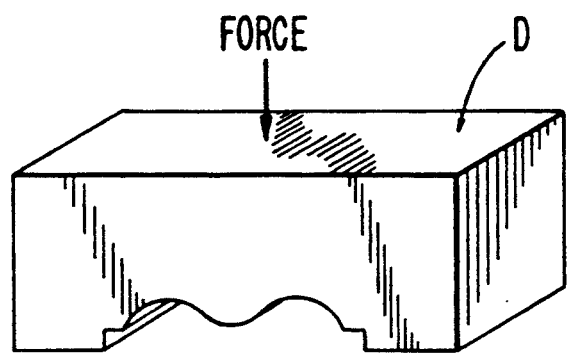
FIG. 8 is a diagrammatic perspective view illustrating a member for bending and shaping a tab.

As a part of the attachment process just described, as the tab 58 is bent toward the body of the plate the tab is preferably deformed from flat to the shape shown in FIGS. 5 and 7, so that the interior contours of the tab match the exterior contours of the outer bushings. FIG. 8 illustrates a metal-forming die D that may be used to bend and shape a tab of a connector, a force being applied to the die as indicated in FIG. 8, while the plate of the connector is supported on an anvil, for example.

As stated earlier, in tire chains disclosed in U.S. Pat. No. 5,056,574 a single bushing is crimped to each end of each cross member cable and is inserted in a keyhole-shaped opening of a plate for connecting the cross member to a side member of the tire chain. With this arrangement, repetitive flexing of cross member cables, which occurs when a tire chain is in use, may cause cross member cables to break where the cables pass through the openings in the plates, and relative movement between the bushings and the plates may cause abrasion wear. The following is an analysis of these breakage and wear problems.

When a single bushing is crimped to a cable end, as in prior tire chains, the cable strands are more tightly compacted, and the cable becomes stiffer within and adjacent to the bushing. When a tire chain is in use, each cross member cable flexes repetitively about the regions where the cable ends pass through the openings in corresponding plates. The bending radius of the cable against edges of the openings can be quite small. The repetitive flexing and bending of cross member cables at these regions causes metal fatigue that may ultimately result in cable breakage. Also, the repetitive flexing and bending of each cross member cable may cause the bushings at the ends of the cable to move relative to the adjacent surfaces of connector plates, which may cause abrasion wear of the bushings and the plates.

When double bushings are used in accordance with the invention, the cross member cables are restrained from flexing and bending at the regions of the plate openings. Essentially, the flex point is moved from a region where the cross cable is relatively stiff to a region where the cross cable is relatively flexible. A wrapped cross member cable may bend until it contacts a corresponding inner bushing, but the inner bushing effectively acts as a funnel to limit the bending radius at a plate opening. Bending and flexing at the region of each plate opening is also limited by virtue of the fact that the bridge of each double bushing lends support to the corresponding cable where the cable passes through a plate opening.

The width of each bridge is preferably only slightly less than the width of the narrow portion of the corresponding plate opening, so that opposite edges of the bridge engage respective opposite edges of the opening. The length of each bridge is preferably such that the adjacent ends of the outer and inner bushings engage respective interior and exterior connector surfaces, which stabilizes the attachment of each cross member cable end to the corresponding connector plate. The shaping of the tabs so that their inner surfaces conform with the outer surfaces of the outer bushings substantially reduces the ability of the outer bushings to move relative to the corresponding plates. This immobilizing of the outer bushings significantly reduces abrasion wear of the outer bushings and the adjacent surfaces of the plates and also reduces vibration.

In tire chains of the type shown in FIG. 1, it is appropriate to use double bushings on each of the cross member cable ends and to shape the tabs of each of the connectors 24, 52, and 54 so as to conform to the shape of the outer bushings. Tire chains having this construction have been tested and found to have substantially greater endurance than similar tire chains without the features of the invention.

While a preferred embodiment of the invention has been shown and described, it will be apparent to those skilled in the art that changes can be made without departing from the principles and spirit of the invention, the scope of which is defined in the appended claims.

For example, although the double bushings and the shaped tabs of the invention cooperate in producing the improved results of the invention, double bushings may be used without shaped tabs, and vice versa. Furthermore, the double bushings and/or shaped tabs may be used at only one side member of a tire chain, rather than at both sides. For example, when a wire hoop is utilized as the inner side member, as disclosed in U.S. Pat. No. 5,056,574, endurance failures are more likely to occur at the inner side member than at the outer side member. This is due to the relative inflexibility of the hoop wire, versus the high degree of flexibility of the outer side member cable. Also, there may be an advantage in utilizing one type of hardware for connecting cross members to an inner side member and another type of hardware for connecting cross members to an outer side member, particularly from the standpoint of assembly automation.

The invention claimed is:

1. A cross member assembly for a tire chain, comprising a flexible cable having a double bushing at least at one end of the cable, the double bushing including an outer bushing located at a distal end of the cable and an inner bushing spaced inward longitudinally along the cable and joined to the outer bushing by a bridge, the outer bushing securely gripping the cable end therein, and the inner bushing embracing the cable without gripping the cable, and a connector adjacent to the end of the cable for connecting the cable to a side member of a tire chain, the connector including a plate having an opening therein through which the outer bushing is inserted, the plate having a bent-over tab extending from a body of the plate and trapping the inserted outer bushing between the tab and the plate body, with the inner bushing located exteriorly of the opening and with the bridge located in the opening.

2. A cross member assembly according to claim 1, wherein the cable is stranded and is wrapped with a helical wire.

3. A cross member assembly according to claim 1, wherein each of said inner and outer bushings comprises a cylinder that is split longitudinally at one side thereof.

4. A cross member assembly according to claim 3, wherein the bridge is located at the opposite side of the cylinders.

5. A cross member assembly according to claim 1, wherein the opening has a wide portion through which the outer bushing is inserted, and a narrow portion in which the bridge is located.

6. A cross member assembly according to claim 5, wherein the wide portion is located in the bent-over tab.

7. A cross member assembly according to claim 1, wherein at least a portion of the connector has a shape that conforms to the shape of the outer bushing, so as to reduce the mobility of the outer bushing relative to the connector.

8. A cross member assembly according to claim 7, wherein said portion of the connector is the tab.

9. A cross member assembly according to claim 1, wherein the outer bushing is crimped onto the cable.

10. A cross member assembly according to claim 1, wherein the width of the bridge is such that opposite edges of the bridge engage respective opposite edges of the opening, and wherein the length of the bridge is such that adjacent ends of the outer and inner bushings engage respective interior and exterior surfaces of the connector.

11. A tire chain cross member assembly comprising a flexible cable and a double bushing, the double bushing including an outer bushing located at a distal end of the cable and an inner bushing spaced inward longitudinally along the cable and joined to the outer bushing by a bridge, the outer bushing securely gripping an end of the cable, and the inner bushing embracing the cable without gripping the cable.

12. A tire chain for use on a tire mounted on a rim of a vehicle wheel comprising:
   (a) an elongated inner side member adapted to form a circle of predetermined circumferences about the rim of the vehicle wheel at an inner side thereof, said inner side member having cooperable fastener elements at opposite ends thereof which join to complete said circle;
   (b) a plurality of cross members forming a substantially uniform zig-zag pattern, with cross members at opposite ends of the pattern converging toward said fastener elements when said fastener elements are joined, said pattern including a plurality of inner vertices adjacent to said inner side member and a plurality of outer vertices remote from said inner side member and adapted to be positioned adjacent to said rim at an outer side thereof, whereby said cross members are positioned to extend back and forth across aid tire, said cross members having attaching means adjacent to the inner vertices for attaching said cross members to said inner side member at predetermined substantially equally spaced positions therealong; and
   (c) tensioning means for drawing said outer vertices toward a rotational axis of said wheel and for providing adjustable substantially equal spacing between successive outer vertices while maintaining said zig-zag pattern substantially uniform;
   wherein said attaching means comprises a plurality of connectors, each of which includes a plate to which adjacent ends of a pair of cross members are attached, and
   wherein said tensioning means comprises a plurality of connectors, each of which includes a plate to which adjacent ends of a pair of cross members are attached,
   each cross member comprising a flexible cable having a double bushing at each of its ends, each double bushing including an outer bushing located at a distal end of the corresponding cable and an inner bushing spaced inward longitudinally along the corresponding cable and connected to the corresponding outer bushing by a bridge, each plate having an opening through which the corresponding outer bushing is inserted and having a bent-over tab that extends from a body of the plate and that traps the corresponding outer bushing between the tab and the plate body, with the corresponding inner bushing located exteriorly of the opening and with the corresponding bridge located in the opening, each outer bushing securely gripping a corresponding cable end, and each inner bushing embracing a corresponding cable without gripping it.

13. A tire chain according to claim 12, wherein a portion of each plate cooperable with a corresponding outer bushing is shaped to conform with the shape of the corresponding outer bushing so as to reduce the mobility of the corresponding outer bushing relative to the plate.

* * * * *

UNITED STATES PATENT AND TRADEMARK OFFICE
CERTIFICATE OF CORRECTION

PATENT NO. : 5,299,613
DATED : April 5, 1994
INVENTOR(S) : Joseph D. MARESH It is certified that error appears in the above-identified patent and that said Letters Patent is hereby corrected as shown below:

Column 7, line 28, "aid" should read --said--.

Signed and Sealed this

Seventh Day of February, 1995

Attest:

BRUCE LEHMAN

*Attesting Officer*  *Commissioner of Patents and Trademarks*